Aug. 6, 1940.                C. J. BACHMAN                 2,210,441
                            POLE OR POST SOCKET
                          Filed Sept. 21, 1937
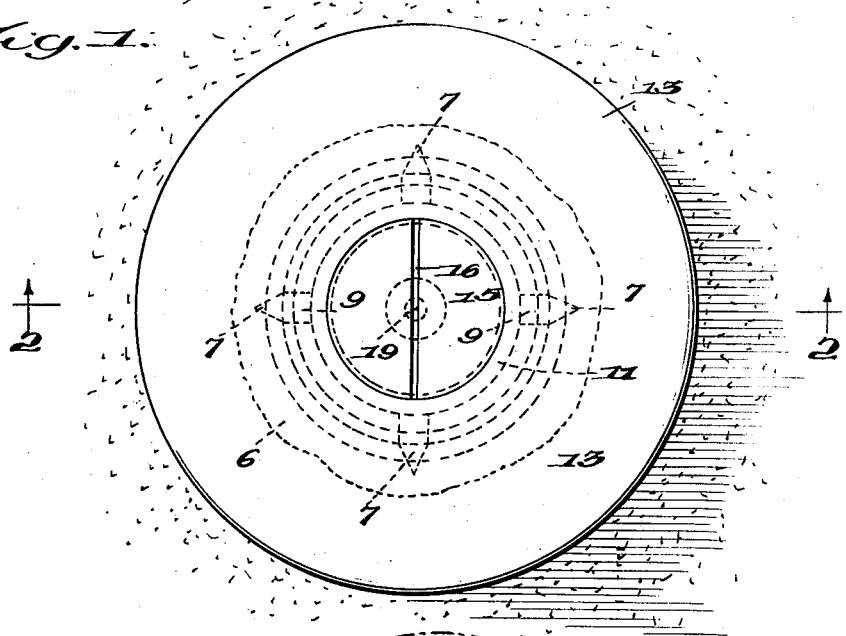
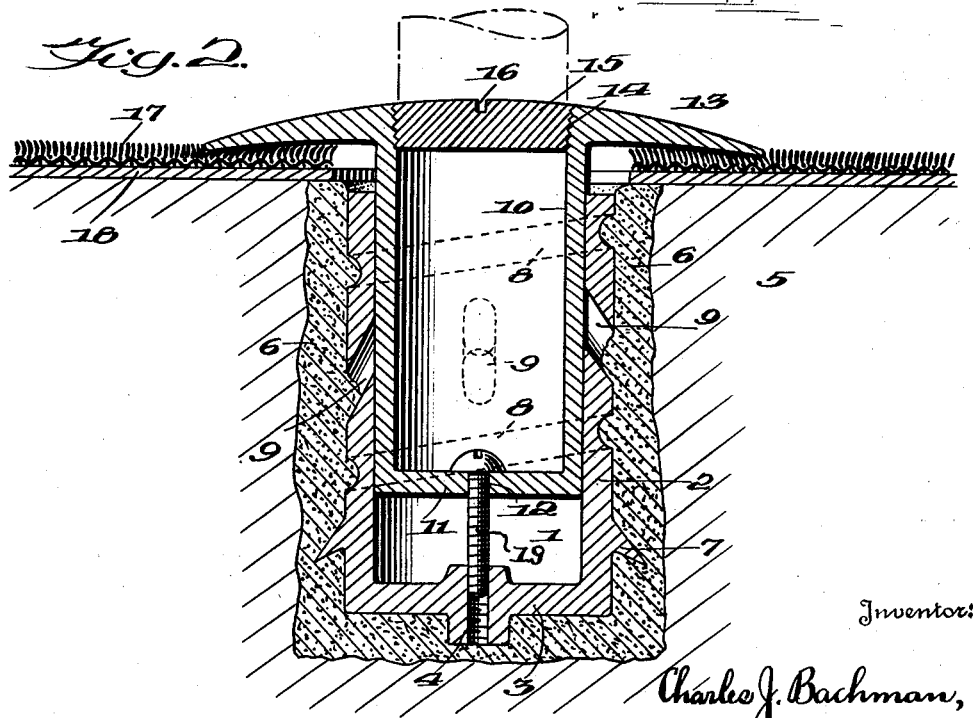
Inventor:—
Charles J. Bachman,
By:— Smith, Michael & Gardiner,
Attorneys.

Patented Aug. 6, 1940

2,210,441

UNITED STATES PATENT OFFICE 2,210,441

POLE OR POST SOCKET

Charles J. Bachman, East Orange, N. J.

Application September 21, 1937, Serial No. 164,928

7 Claims. (Cl. 72—105)

My invention relates to a pole or post socket and has particular reference to a socket adapted to be embedded in a floor, sidewalk or other surface to receive therein the end of a pole or post.

It is an object of my invention to provide a pole or post socket which may be readily embedded in a floor, sidewalk or other surface, which socket includes a relatively thin, overlying, marginal flange portion disposed substantially flush with respect to such surface, whereby the socket presents a pleasing and attractive appearance and does not constitute an obstruction or projection extending above the plane of such surface.

It is an object of my invention to provide a pole or post socket including a base which may be readily embedded in a floor, sidewalk or other surface, and an inner portion associated with the base and having a relatively thin, overlying, marginal flange, and to provide means whereby the inner portion and its associated flange may be adjusted with respect to the base portion to permit the use of the socket on surfaces covered with carpet, linoleum or other surface coverings.

It is a still further object of my invention to provide a pole or post socket which is cheap and simple to manufacture, assemble and install; is strong and durable; and is highly efficient in the purposes for which designed.

While the pole or post socket forming the subject-matter of my present invention is capable of use for many different purposes, the same is especially useful in theatre lobbies, waiting rooms and the like, where it is frequently desirable that suitable sockets be installed to receive the pole or post of "Standee rails" or the like, usually employed to confine the persons waiting to enter the theatre. In order to be entirely satisfactory, such sockets must be strong and durable, must have their upper surfaces substantially flush with the floor surface, must present a pleasing appearance, and must be capable of installation in connection with the carpet, linoleum, tile or other covering applied to the floor of the lobby, waiting room or the like.

In the accompanying drawing wherein I have shown a preferred embodiment of my invention;

Figure 1 is a plan view of my improved pole or post socket, and

Figure 2 is a vertical sectional view of the same on the line 2—2 of Figure 1.

Referring to the drawing wherein like reference numerals have been employed to designate like parts throughout the several views, the numeral 1 designates, broadly, the base of the socket, which base comprises a tubular portion 2 open at its outer or upper end and having a substantially closed inner or bottom end 3 provided with a preferably centrally positioned, internally threaded aperture 4. The base 1 is adapted to be embedded within a floor or wall 5 with its outer or upper end substantially flush with the surface of said floor. When it is desired to install the socket, a hole or a cavity of a diameter greater than the outside diameter of the base 1 is made in the floor, the base 1 is inserted within the hole, and cement, molten lead or other self-setting material 6 is poured into the space between the base and the walls defining the hole, which material, upon setting, securely locks the base in the floor. In order to assist in securely locking the base in position, I preferably provide the outer surface of the tubular portion 2 of the base with any convenient form of irregularities, as for example, radially extending spikes 7, or spiral groove 8, which irregularities promote the bonding action and definitely interlock or key the base within the self-setting material 6. Preferably, I provide apertures 9 through the walls at conveniently located parts of the tubular portion 2, which apertures function as vents during the pouring of the self-setting material 6.

The inner member of the socket comprises a tubular portion 10 open at its outer or upper end and having a substantially closed inner or bottom end 11 provided with a preferably centrally positioned aperture 12. This inner portion has an external diameter slightly less than the internal diameter of the base 1 and is adapted to be slidably or telescopically engaged within the said base, preferably frictionally engaging the sides as clearly illustrated in Fig. 2 of the accompanying drawing. The outer or upper end of the inner member of the socket terminates in a laterally extending marginal flange 13, which flange is substantially flat on its under side and is convexed on its upper side to form a thin outer edge. The inner surface of the tubular portion 10 near its outer or upper end is provided with threads 14 to receive therein a removable, threaded plug or closure 15 preferably substantially flush with the top surface of the flange 13. The plug 15 is provided with a slot 16 for engagement with a screw driver or the like.

As a means for adjusting the vertical position of the inner member with respect to the base 1, I provide a headed screw 19 which is passed through the aperture 12 and is engaged within the threaded aperture 4 in the bottom 3 of the base 1. Assuming that the plug 15 is removed, a screw-driver is engaged with the screw 19 and the said screw rotated to slide the inner member into or out of the base 1 to thus vary the distance between the flange 13 and the floor or other surface in which the socket is installed.

It is believed that the purpose of the pole or post socket of my present invention will be readily apparent from the foregoing description. It will be obvious that when it is desired to provide a means for temporarily or otherwise erecting a barrier, for example, erecting "Standee rails" in a theatre lobby or the like, a series of holes are made in the floor at spaced intervals, each hole being of a diameter somewhat greater than the external diameter of the base 1. A base 1 is then placed in each hole with the upper end of the tubular portion 2 substantially flush with the surface of the floor, and cement, molten lead or other self-setting material 6 is poured into the space surrounding the base member. The material 6 flows beneath the spikes 7 and into the groove 8, the air displaced by the said material escaping through the apertures 9. When the material 6 is set, the base 1 is rigidly embedded or keyed into the floor. The padding 18 and superimposed rug 17 or other floor covering is then put in place, and a hole is cut through the same immediately above the base of the socket and of a diameter substantially that of the said base. The inner member of the socket is then passed through the hole in the floor covering and inserted into the base 1 with the aperture 12 in vertical alignment with the threaded aperture 4 and with the flange 13 overlying the floor covering. The screw 19 is then passed through the aperture 12 and is threaded into the aperture 4 to draw the inner member downwardly into the base 1 and to thus cause the flange 13 to be forced into firm, intimate contact with the surface of the floor or floor covering. The plug or closure 15 is then screwed into the open end of the inner member, thus completing the installation. It will be seen that the flange 13 completely overlies the hole cut in the floor and the hole cut through the floor covering, and that the socket presents a neat and attractive appearance. It will be seen, further, that the flange 13 is substantially flush with the surface of the floor and that the socket does not have any upwardly extending or projecting portions. When it becomes necessary to erect a barrier such as a "Standee rail" consisting of a plurality of spaced holes or posts connected by ropes or chains, the plug or closure 15 is removed and the lower end of a pole or post of the "Standee rail" is inserted into the socket. When the floor padding and/or rug are to be removed for replacement or repair, it is only necessary to remove the plug or closure 15, to unthread the screw 19, and to remove the inner member from the base 1.

It will be understood that the form of my invention illustrated and described herein is to be taken as a preferred embodiment of the same and that various changes may be made in the shape, size and arrangement of parts without departing from the spirit of my invention or the scope of the subjoined claims. For example, it is not essential to the carrying out of my present invention that the base and the inner member be of circular cross-section; the spikes 7, instead of being circumferentially spaced, may be replaced by a circumferentially extending flange or flanges; the groove 8 need not be of spiral formation, but might well be a series of separate recesses or a series of separate and disconnected grooves; the apertures 9 may be omitted; means other than the screw 19 might be employed to adjust the inner member vertically with respect to the base 1; and the socket may be used with floors which are not covered by rugs, linoleum or the like, in which event the flange 13 will be forced into direct contact with the upper surface of the floor.

Having thus described my invention, I claim:

1. A pole or post socket comprising a tubular base having an open upper end and a substantially closed bottom end, a tubular pole or post receiving member having an open upper end and a substantially closed bottom end and slidable within said tubular base, and means for sliding said member within said base to vary the position of the upper end of said member with respect to the upper end of said base.

2. A pole or post socket comprising a tubular base having an open upper end and a substantially closed bottom end, said bottom end having a screw-threaded aperture therein; a tubular pole or post receiving member having an open upper end and a substantially closed bottom end and slidable within said tubular base, the bottom end of said member having an aperture in alignment with the screw-threaded aperture in the bottom of said base; and a screw passing through said aperture in the bottom of said member and engaging the threaded aperture in the bottom of said base, which screw, upon rotation, varies the position of the upper end of said member with respect to the upper end of said base.

3. A pole or post socket comprising a tubular base having an open upper end and a substantially closed bottom end, said bottom end having a screw-threaded aperture therein; a tubular pole or post receiving member having an open upper end and a substantially closed bottom end and slidable within said tubular base, the open upper end of said member having a laterally extending flange and the bottom end of said member having an aperture in alignment with the threaded aperture in the bottom of said base; and a screw passing through said aperture in the bottom of said member and engaging the threaded aperture in the bottom of said base, which screw, upon rotation, varies the position of the laterally extending flange with respect to the upper end of the base.

4. A pole or post socket comprising a base adapted to be embedded in a hole in a floor and to be retained therein by a self-setting material introduced between said base and the walls defining the hole, said base having projections on its outer surface to overlie portions of the self-setting material to rigidly secure said base within the hole, a pole or post receiving member associated with said base with its upper end projecting at least to the surface of said floor; and means for moving said member with respect to the base to vary the position of said member with respect to the surface of said floor.

5. A pole or post socket comprising a base adapted to be embedded in a hole in a floor and to be retained therein by a self-setting material introduced between said base and the walls defining the hole; a pole or post receiving member associated with said base with its upper end projecting at least to the surface of said floor; and means for moving said member with respect to the base to vary the position of said member with respect to the surface of said floor.

6. A pole or post socket comprising a tubular base adapted to be embedded in a hole in a floor and to be retained therein by a self-setting material introduced between said tubular base and the walls defining said hole, said base having apertures through its tubular walls to permit the escape of air displaced by the self-setting material as said material is introduced into the space between the said tubular walls and the walls defining the hole; a pole or post receiving member associated with said base with its upper end projecting upwardly at least to the surface of said floor; and means for moving said member with respect to the base to vary the position of said second member with respect to the surface of said floor.

7. A pole or post socket comprising a tubular base having an open upper end and at least a substantially closed bottom, a receiving socket having a flanged open upper end and at least a substantially closed bottom and movable lineally within said base, and means for adjustably fixing the position of the socket within the base whereby the distance between the flange and open upper end of said base may be varied, said flange having a diameter greater than the base.

CHARLES J. BACHMAN.